3 Sheets—Sheet 1
W. VON F. Du FAUR.
Blast Furnace.
No. 67.
Reissued Jan. 23, 1845.
Fig. 1 Vertical Section through a Blast Furnace
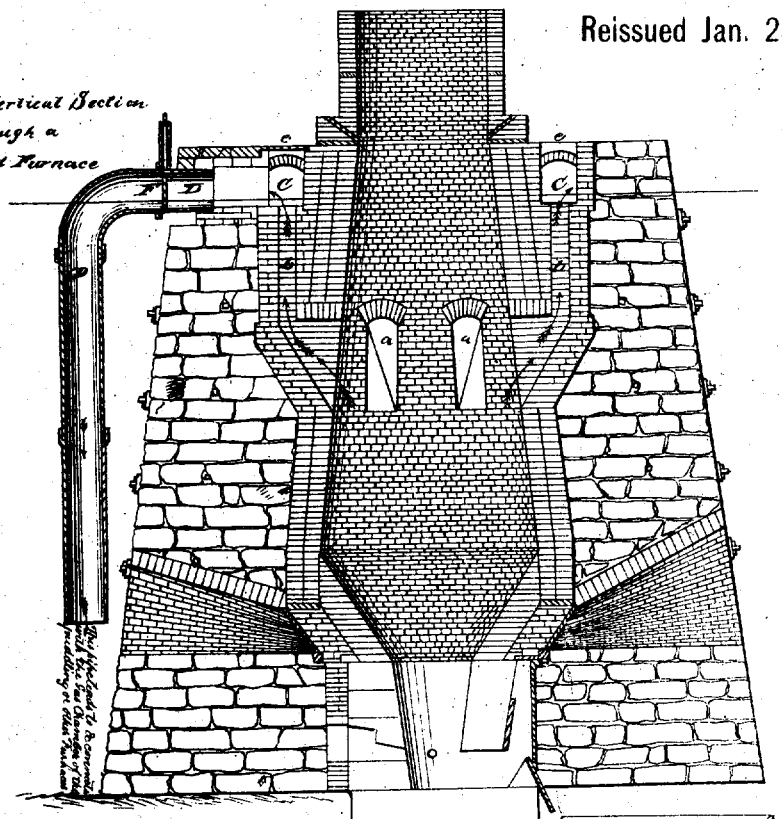
Fig. 2 Horizontal Section through the line XX
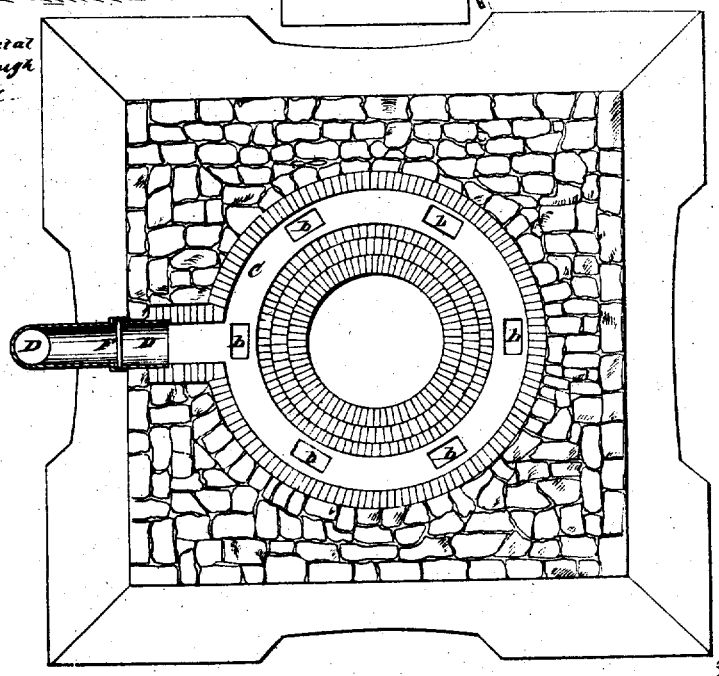
Witnesses:
Inventor:

3 Sheets—Sheet 2.
W. VON F. Du FAUR.
Blast Furnace.
No. 67. Reissued Jan. 23, 1845.
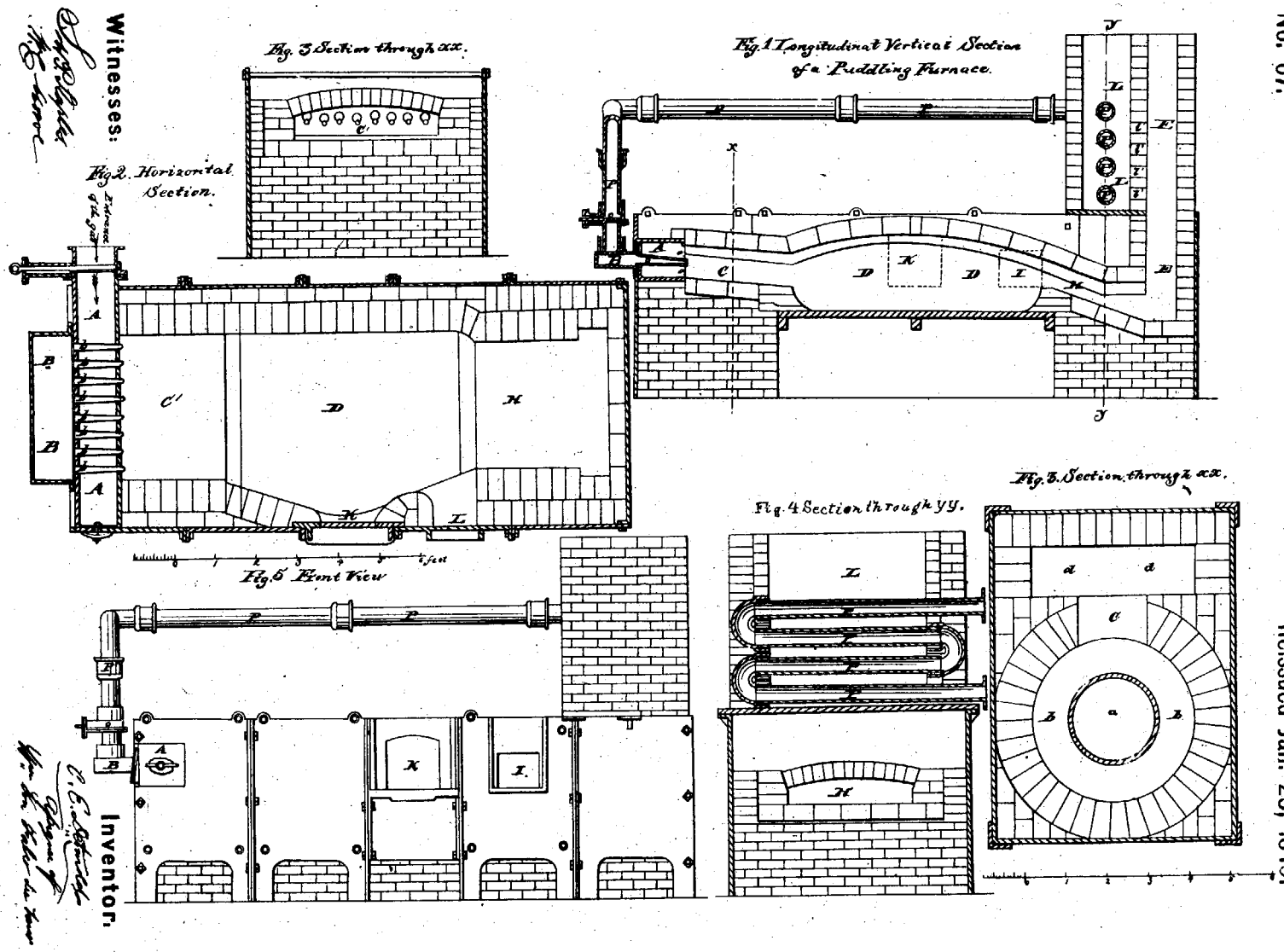
Witnesses:
Inventor:

3 Sheets—Sheet 3
W. VON F. Du FAUR.
Blast Furnace.
No. 67.
Reissued Jan. 23, 1845.
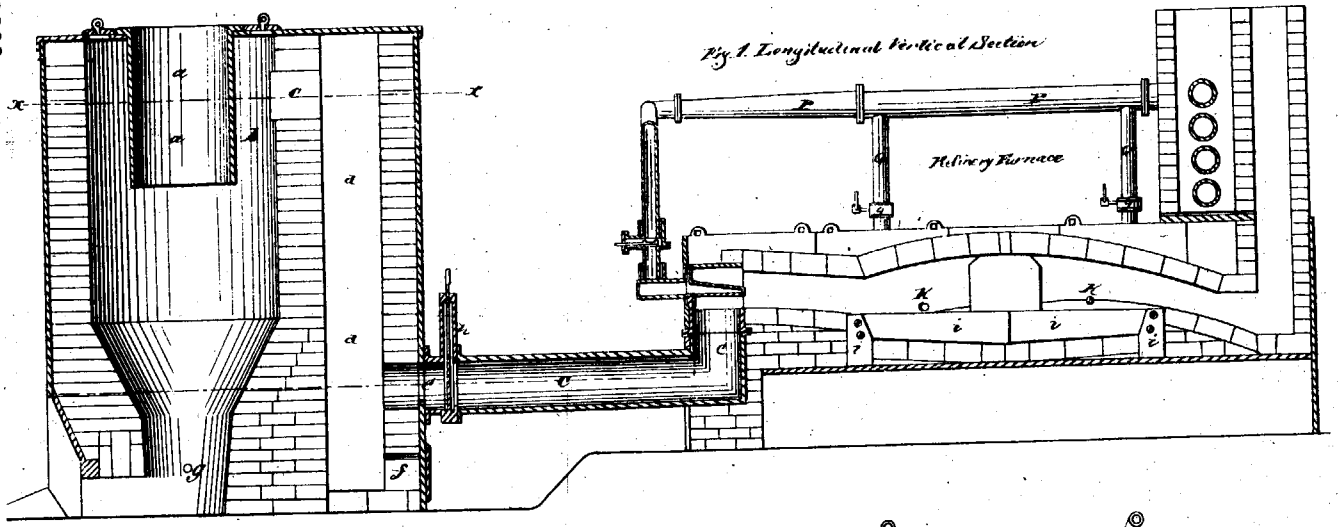
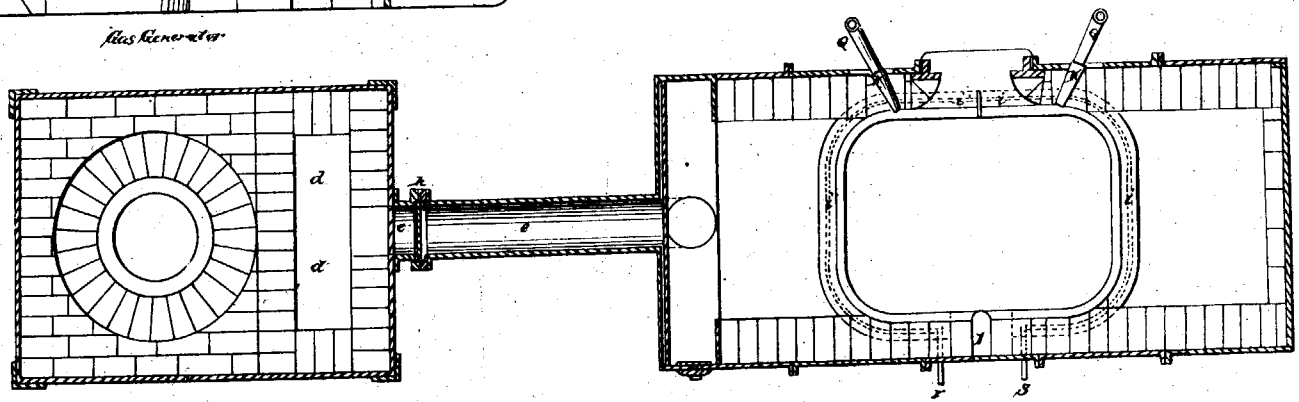
Witnesses:
Inventor:

UNITED STATES PATENT OFFICE.

C. E. DETMOLD, OF NEW YORK, N. Y., ASSIGNEE OF W. VON FABER DU FAUR.

IMPROVEMENT IN THE MODE OF GENERATING AND APPLYING HEAT.

Specification forming part of Letters Patent No. 2,558, dated April 16, 1842; Reissue No. 67, dated January 23, 1845.

*To all whom it may concern:*

Be it known that WILHELM VON FABER DU FAUR, of Wasseralfingen, in the Kingdom of Würtemberg, did invent a new and useful invention for Generating and Applying Heat; and I do hereby declare that the following is a full and exact description.

In all blast and other furnaces employed in the manufacture of iron and other metals a large quantity of combustible gases, principally consisting of the carbonic-oxide gas, is generated and escapes unconsumed out of the furnaces. I have discovered and invented a new mode of employing these otherwise lost gases usefully, and of producing by their combustion a most intense temperature, which may be applied with great advantage in the manufacture of iron and other metals, to the heating of steam-boilers, and generally wherever a high temperature is required. I collect these combustible gases from blast, cupola, and other furnaces or fire-places, or from furnaces constructed for the express purpose of producing them, and conduct them to the other furnaces or structures that are to be heated by them, where their combustion is effected by mixing with them an adequate quantity of heated air in numerous small streams under a pressure greater than that of the atmosphere. This may be done by forcing the heated air through apertures in the sides of pipes or other apparatus, but is best effected by forcing it amidst the combustible gases through a system of blow-pipes. Thus the oxygen of the atmospheric air becomes thoroughly incorporated with the combustible gases, so that their combustion is at once completely effected and a heat produced sufficiently high for any kind of manufacture.

My invention therefore consists, first, in a new mode of obtaining and collecting carbonic-oxide and other combustible gases from blast and other furnaces or fire-places, or from furnaces constructed for the express purpose of producing the same; second, in a new mode of effecting the perfect combustion of the gases so obtained.

Having thus generally stated the character of my invention, I will describe more particularly its application to the manufacture of iron.

In the first place I will describe the mode of obtaining the gases from a blast or smelting furnace, reference being had to Plate No. I of the annexed drawings.

Figure 1 is a vertical section through a blast or smelting furnace. Fig. 2 is a horizontal section of the same through the line *x x*.

*a a a a a a* are six openings or recesses in the inwalls or linings of the furnace, which are made at or near that point of the furnace where the limestone employed as a flux is completely calcined, and the reduction or deoxidation of the ores has not yet commenced. This point will generally be at about one-third of the height of the whole furnace below tunnel-head, or two-thirds above the bottom stone. The recesses *a a a a a a* communicate, by means of the passages or flues *b b b b b b*, with an annular reservoir, C C, that surrounds the whole of the inwalls of the furnace. The pipe or duct D D communicates also with the reservoir C C. The resistance offered to the escape of the gases out of the top of the furnace by the mass of coal, ores, and flux above the openings *a a* will cause a large portion of the gases to flow into them and to ascend through the flues or passages *b b* into the reservoir C C, whence they are conducted by the pipe D D to the furnaces that require to be heated. The reservoir C C is constructed of fire-brick, or may be constructed of iron. It has six openings, *e e*, immediately over the passages or flues *b b*, which are kept closed by plates of iron so arranged that they may be conveniently removed for the purpose of allowing the reservoir and flues to be occasionally cleaned from the dust that collects in them. The pipe D D is provided with a valve or gate, F, by which the admission of the gases to the furnaces where they are to be used may be regulated. The number and size of the openings to be made in the furnace depend on its general dimensions and the quantity of gases to be drawn off. A less number than six will in many instances be found sufficient; nor is the reservoir C C for collecting the gas in all cases necessary, inasmuch as the insertion of a pipe into the side of the furnace at the proper height will generally afford the requisite quantity of gas for the heating of a single furnace, or for heating the boiler of the blowing-engine, or for the hot-blast apparatus.

I have used other modes of collecting and drawing off the combustible gases from blast-furnaces—as, for instance, by inserting an iron cylinder into the top of the furnace. This cylinder should be sufficiently long so that its lower edge may reach down to the point indicated above as being the most proper for drawing off the gases. The diameter of this cylinder should be about two feet less than the top of the furnace, thus forming an annular chamber between the outside of the cylinder and the inwalls of the furnace, which chamber must be closed on top. The blast-furnace is charged through the cylinder, which must be kept full, or nearly so. Thus the gases will ascend into the annular chamber or reservoir, whence they are conducted in a similar manner as above described to the furnaces or other structures that are to be heated by them. This mode of drawing off the gases is exemplified in Figs. 1 and 2, Plate III. The mode first described above, and illustrated by Figs. 1 and 2, Plate No. I, I have found, however, the best in practice. In cases where there is no blast-furnace from which the combustible gases may be collected, a separate furnace must be built for the purpose of generating the combustible gases from any kind of fuel. This furnace may be constructed somewhat like a small blast-furnace or cupola, which is to be filled with fuel, and sufficient air blown into it to produce the requisite quantity of combustible gases, which are conducted thence, in a similar manner as that above described, to the furnaces that are to be heated thereby. This mode of generating combustible gases is illustrated by Figs. 1 and 2, Plate No. III.

Secondly, I proceed to describe my invention for effecting the perfect combustion of the gases after having been obtained in the modes above described, and for the purpose of explaining this part of my improvements more fully I will describe its application to a furnace for puddling or decarbonizing iron, it being understood that a similar arrangement of parts is applicable to all other processes in the working and manufacture of iron, or any other purposes requiring a high temperature.

Fig. 1, Plate No. II, represents a longitudinal vertical section of a puddling-furnace. Fig. 2, Plate No. II, is a horizontal section. Fig. 3, Plate No. II, is a vertical cross-section through the line *x x*. Fig. 4, Plate No. II, is a vertical cross-section through the line *y y*, showing the arrangement of the pipes for heating the air. Fig. 5 is a front view of the furnace.

A A is the gas-chamber, into which the combustible gases are conducted by means of the pipe D D. (See Plate I, Fig. 1.) It is best made of cast-iron, but may also be built of brick, and extends entirely across the end of the furnace. In the front or side toward the hearth there is an oblong horizontal opening *a′ a′ a′*, of the same dimensions as the fire bridge, through which opening the gases stream into the furnace.

B B is a cast-iron air-chamber, into which the hot blast is brought through the pipe *p p*. It is attached to the back of the gas-chamber A A by means of a flange and screws. The gas-chamber A A has an opening corresponding exactly to the size of the air-chamber B B, from which issue a system of six or more blow-pipes, *b′ b′ b′ b′ b′ b′*, made of wrought-iron, and slightly tapering toward the mouth, which is flattened a little, the horizontal diameter being about one and one-half inch and the vertical diameter three-fourths inch. These blow-pipes are riveted upon a piece of sheet-iron, and interposed between the hot-air chamber B B and the back of the gas-chamber A A. They are made long enough to project about half an inch through the gas-chamber, and are so placed as to incline slightly downward to the hearth of the furnace, the same as the fire-bridge C′ C′, for the purpose of throwing the flame more directly upon the metal under operation. The fire-bridge C′ C′ is made much longer than in ordinary furnaces, so as to allow the combustible gases and the streams of heated air to become thoroughly combined before reaching the hearth where the metal is worked. The length of the fire-bridge is in some measure regulated by the pressure of the blast used. Two feet will generally be found sufficient; but with a very powerful blast two and one-half feet, and with a blast of feeble pressure one and one-half foot, will be an adequate length of fire-bridge.

D D is the main chamber of the furnace, where the metal is worked. Its dimensions are the same as in puddling-furnaces of ordinary construction. The hearth or bottom is constructed of cast-iron plates, the same as in the common puddling-furnaces.

H is the throat or flue of the furnace.

K is the working-door.

I is a door through which the pig-iron or fine metal is charged upon the further end of the hearth for the purpose of heating it by the waste heat before charging it on the main hearth.

P P P P is a system of hot-air pipes placed in the chamber L L adjoining the stack E, and communicating with it by means of numerous openings, *l′ l′ l′ l′*, left in the brick partition that separates the chamber from the stack. The burned gases, in their passage out of the stack, communicate sufficient heat through these openings to the pipes to heat the blast to the required temperature—say from 300° to 500° Fahrenheit. The pipes P P communicate with the hot-air chamber B through the pipe P′, which is provided with a valve, O, for the purpose of regulating the quantity of air for the combustion of the gases.

E is the stack through which the burned gases finally escape, and as the combustion of the gases is effected by means of an artificial blast of a pressure greater than the atmosphere these furnaces require no high stack or chimney for the purpose of creating a draft.

When a furnace of this kind is to be put into operation, the valve that admits the gases into the chamber A is partially opened, so as to admit a small quantity of gas, which is then ignited. After this the valve that admits the air is gradually opened and the gas allowed to burn with a moderate flame until the masonry of the furnace is properly dried, after which the quantity of gas and air is increased by opening the valves, so as to heat the furnace to the requisite temperature. Great care must be taken not to admit too large a quantity of gas and air at once, as the sudden ignition of a large volume of combustible gas is apt to crack the masonry of the furnace. After the furnace has been brought to a proper heat, the iron is charged, the same as in ordinary puddling furnaces, and the operation of puddling is performed the same as usual.

It is important, in order to avoid as much as possible the loss of metal by oxidation during the process of puddling, to admit only such quantity of air through the blow-pipes as is necessary to produce the perfect combustion of the gases, of which the workmen can readily judge by the state of the furnace, which is cooled by an excess of air. On the other hand, an excess of gas must also be avoided, as it tends to retard the process of decarbonization. This is readily perceived by the escape of flame from the furnace-stack. The same precautions must be observed with all other gas-furnaces employed in the different processes of manufacturing iron.

Plate No. III, Figs. 1 and 2 represent a gas-generating furnace with a refinery attached. Furnaces of this kind for generating combustible gases from any kind of fuel may be employed with great advantage over the ordinary mode of burning the fuel in reverberatory furnaces.

Fig. 1 exhibits a longitudinal vertical section of the gas-generator and refinery. The gas-generator is constructed like a small blast-furnace. Into the top of it is inserted a cast-iron cylinder, *a a*, about twenty inches less in diameter than the upper part of the furnace. The cylinder is supported by a broad flange resting upon the walls of the furnace. The space *b b* between the exterior of the cylinder and the inside of the furnace forms an annular chamber into which the gases that are generated ascend, and whence they pass through the opening C into the descending flue *d d*, into which the iron pipe *e e e* is inserted, which conducts the gases into the refinery or other furnace that is to be heated by them.

The gas-generating furnace is filled with coal through the iron cylinder, which must always be kept full to the top, so as to compel all the gases to enter the chamber *b b*. This may also be effected by closing the top of the cylinder by a movable door, to be lifted only when the furnace is charged with coal. Through the tuyeres *g* a sufficient quantity of air is forced into the furnace to produce slow combustion of the coal. The gaseous products of this combustion will, in their ascent through the superincumbent body of ignited coal, be converted into combustible gas, chiefly consisting of the carbonic-oxide gas.

*f* is an opening through which the coal-dust that collects in the bottom of the flue is occasionally cleaned. This opening is kept closed by an iron door.

*h* is a valve by means of which the quantity of gases to be admitted into the refinery is regulated.

*e e e* is the pipe that conducts the gases to the refinery-furnace.

The refinery-furnace, in its general construction, is the same as the puddling-furnace above described, differing from it chiefly in this, that at the back or front there are two tuyeres, K K, through which heated air is blown upon the melted iron for the purpose of purifying and in part decarbonizing it. The hot air is supplied from the pipe P P by means of the branches Q Q, which are provided with valves *q′ q′*, by which the supply of air is regulated. The sides of the main chamber or hearth, where the iron is refined, are made of solid frames or blocks of cast-iron, with a wrought-iron pipe of about one-inch diameter cast in, through which a stream of cold water is made to circulate for the purpose of protecting them from the intense heat and the destructive action of the melted metal and scoria. These water-blocks are shown at *i i i* in Figs. 1 and 2. The water enters at *r* and is discharged at *s*. The bottom of the refinery-furnace is made of fire-brick set edgewise, or of fire-sand.

I is the tapping-hole, through which the melted iron is run out after having been refined.

Fig. 2 is a horizontal section. Fig. 3 is a section through the line *x x*.

The reheating or mill furnaces are much the same in point of construction and arrangement of parts as the puddling and refinery furnaces above described, differing from them in their dimensions only, and making any further description of them unnecessary, as the above description of the puddling-furnace sufficiently elucidates the nature and application of my invention to enable others skilled in the art of constructing and managing furnaces to apply the same to any processes in the manufacture and working of metals, or to the heating of the hot-blast apparatus or blast-furnaces, or to steam-boilers, or to any other purposes requiring a high temperature.

The advantages resulting from the use of my invention are, first, a more intense and equal heat than can be obtained by any fuel in the ordinary modes of combustion now in use; second, complete and effective combustion of the fuel, and consequently a most important economy in the same, and the avoiding of all smoke; third, diminished loss of metal from oxidation in the different processes of working iron or other metals.

Having thus fully described my invention and improvements in generating and applying heat, I proceed to specify more particularly what I claim as my invention and improvements—

1. The collecting and drawing off the combustible gases, chiefly consisting of carbonic-oxide gas, from blast and other furnaces at one or more points below the top of the fuel in said furnaces, substantially as set forth in the above specification, for the purpose of employing said gases, instead of other fuel, for the heating of all kinds of furnaces used in the various processes of manufacturing and working iron and other metals, and for the heating of steam-boilers or any other structures requiring a high temperatnre.

2. The above-described mode, or any other substantially the same, of generating combustible gases from any kind of fuel in separate furnaces or chambers, and conducting the same to other fernaces or structures that are to be heated by the combustion of said gases.

3. The above-described mode, or any other substantially the same, of forcing through a system of blow-pipes, or in any other convenient manner, heated air in numerous small streams and under a pressure greater than that of the atmosphere, into the said combustible gases in the furnaces or structures where the same are to be used, for the purpose of producing by the rapid and intimate mixture of the heated air with the combustible gases their immediate and complete combustion.

In testimony whereof I, the said CHRISTIAN EDWARD DETMOLD, subscribe my name, in the pressure of the witnesses whose names are hereto subscribed, on the 8th day of January, A. D. 1845.

C. E. DETMOLD,
*Assignee of Wm. Von Faber du Faur.*

In presence of—
THO. CHAMBERS,
R. B. COLUMM.